No. 744,251. PATENTED NOV. 17, 1903.
A. E. SMITH.
KINETOSCOPE.
APPLICATION FILED MAR. 5, 1903.
NO MODEL.
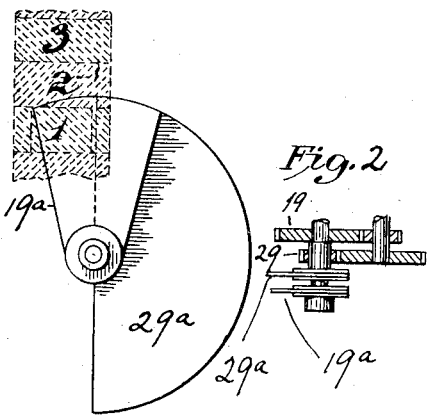
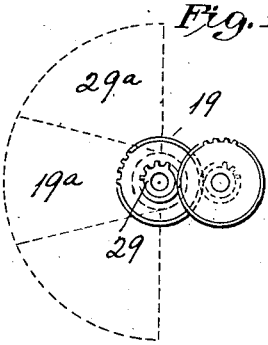
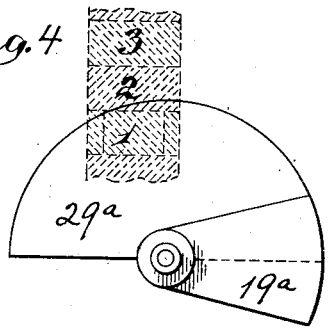
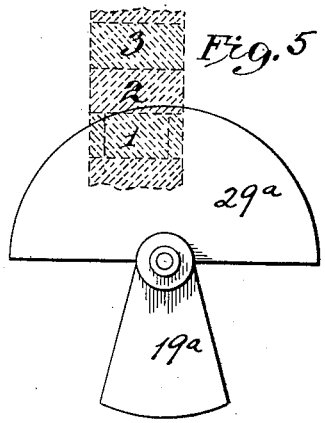
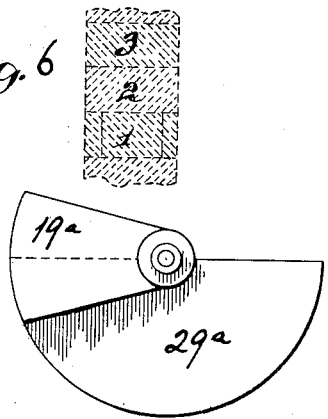
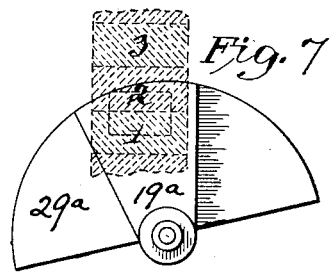
Witnesses
Herman Meyer
Ernest H. Boise
Albert E. Smith Inventor
By His Attorney William R. Baird No. 744,251. Patented November 17, 1903.

UNITED STATES PATENT OFFICE.

ALBERT E. SMITH, OF BROOKLYN, NEW YORK.

KINETOSCOPE.

SPECIFICATION forming part of Letters Patent No. 744,251, dated November 17, 1903.

Application filed March 5, 1903. Serial No. 146,274. (No model.)

*To all whom it may concern:*

Be it known that I, ALBERT E. SMITH, a citizen of the United States, and a resident of Brooklyn, in the county of Kings and State of New York, have invented certain new and useful Improvements in Kinetoscopes, of which the following is a specification.

My invention relates to moving-picture machines; and its novelty consists in the means employed to prevent or disperse the flicker of the picture projected upon the screen. In machines of this class comprising an intermittently-moving film actuated by means of sprocket-wheels or similar mechanism, whereby a continuous film is forced intermittently forward in front of a film-aperture through which the light passes, a shutter is commonly employed to conceal from the observer the movement of the film from one of its positions of rest to the next position of rest. This shutter is usually made in the form of a sector constituting a revolving diaphragm actuated by gearing from the operating-crank of the machine, and it is so timed as to intercept the light as the picture is moved. If this shutter is not employed, the motion of the film from one position of rest to another causes the picture projected upon the machine to look streaked and blurred, as though the colors had run. When, however, the shutter is employed, although the difficulty referred to is obviated another arises—viz., there occurs a flicker on the picture, which produces a most unpleasant impression upon the observer. Persons skilled in this art have long tried to overcome this flicker, but so far as I know have not measurably succeeded. The purpose of my invention is to lessen or dissipate it, and although I do not entirely remove it I do remove so much of it that its disagreeable features are done away with.

I accomplish the purpose stated by interposing in the path of the light between the source of illumination and the screen upon which the picture is projected means for very rapidly and intermittently intercepting the light. By "rapidly" I mean rapidly as compared with the rate of motion of the film, so that the light is cut off from four to twelve times during each period of rest of the film. I do not confine myself to these precise limits of interception, but I give them as examples. Four is probably too slow, but, nevertheless, will produce an appreciable effect. Eight I have found to be a good number. I do not wish to limit myself either to any particular size or shape of shutter. I have found that a disk of one hundred and eighty degrees for some subjects is advantageous, while a smaller disk is better for others. In the case of pictures of any particular class the size and shape of the disk will have to be determined by previous experiment. The means which I employ for this purpose consists of a shutter mounted to revolve in a plane at right angles to the path of the light, which path it crosses a number of times while the film is at rest. This shutter is actuated by intermediate multiplying-gearing driven from the crank of the apparatus. Of course the effect of such numerous intersections of the light is to lessen somewhat the amount of illumination, but it also lessens the flicker referred to.

The principle upon which my invention is based seems to be that the eye of the observer becomes so accustomed to the rapid intermission of the illumination by the revolution of the shutter referred to that when the main shutter is moved when the film is moved from one position to another such movement of the main shutter is not particularly noticed, and the only perceptible effect to the observer is a slight but general toning down of the picture.

In the accompanying drawings, Figure 1 is a side elevation of the multiplying-gear by which the two shutters are rotated, the shutters themselves being shown in dotted outline. Fig. 2 is an elevation and partial section of the same, only a portion of the shutters being shown. Figs. 3, 4, 5, and 6 represent different relative positions of the film and the two shutters as the latter are rotated.

The machines of the class to which my invention relates are made of different forms by different makers. One approved form of the apparatus is shown and described in Letters Patent of the United States No. 673,329, issued to me April 30, 1901, and reference is made to that patent for the details of the mechanism not directly connected with the subject-matter of this application. In the Letters Patent referred to there is shown the film-propelling mechanism, the surrounding parts, and the shutter to which I have above referred. This shutter is rotated at such a rate of speed and is so timed that it intercepts the light just as the film is moved from one position of rest to another. The means for rotating it consists of a pinion actuated by suitable gearing, which in turn is actuated from the handle of the machine. This mechanism is quite fully described in the patent above referred to, and such description need not be repeated here.

In the drawings, 19ª is the shutter adapted by its rotation to intermittently cut off the light from the film as it is moved from one position of rest to another, and 19 is the actuating-pinion. This shutter is preferably made in the form of a sector of a circle and of light flexible metal. Mounted upon the same shaft as the shutter 19ª is the second shutter 29ª, rotated by the pinion 29. This pinion 29 moves any desired number of times faster than the pinion 19. Consequently the shutter 29ª rotates that much faster and passes the larger number of times past the light-aperture of the machine and intercepts the light that much oftener.

Successive sections of the film are designated 1, 2, and 3. It will be understood that each of these sections displays a picture. In Figs. 3, 4, 5, and 6 the shutter 19ª is shown in the several successive positions which it would assume if it were revolving in the same direction as the hands of a watch. Now while it has been moving from the position shown in Fig. 3 to that shown in Fig. 6 and the film has been stationary the shutter 29 will have rotated several times, depending upon the relation of the actuating-gears 19 and 29, and will have been, for instance, during this time in the positions shown in the several figures with respect to that of the shutter 19ª.

In Fig. 7 is shown the position of the shutter 19ª just as the film is being moved downward to a new position, this shutter intercepting the light while the motion is taking place and the section 2 is moving from the position it occupied to the position which section 1 has occupied. In the meantime the shutter 29ª continues to rotate, whether it actually intercepts the light at that particular moment being immaterial.

The shutter 29ª may of course be placed at any other point in the path of the light from the source of illumination to the screen on which the picture is projected. I have found it convenient, however, to place it in close proximity to the shutter 19ª and to actuate it from the same mechanism. Of course the rotation of the shutter 29ª is actually continuous; but its interception of the light is intermittent, because it only passes the beam of light during a portion of its revolution.

Other means than a revolving shutter may be employed to carry out the principles of my invention; but I regard any such means as an equivalent if it has the functional effect of rapidly (as compared with the movement of the film) and intermittently intercepting the light passing through the film, and thus reducing the flicker upon the screen.

Having described my invention, what I claim as new is—

1. In a moving-picture machine an intermittently-moving shutter adapted to screen the film while it is being moved from one position to another, and means interposed between the source of light and the screen adapted to intermittently intercept the light consisting of a shutter moving much more rapidly than the first-named shutter.

2. In a moving-picture machine, a shutter adapted to screen the film while it is being moved from one position to another, a second shutter adapted to intermittently intercept the light while the film is at rest, a shaft common to both of said shutters and actuating mechanism for said shutters operating to drive the second shutter at a higher rate of speed than the first-mentioned shutter.

3. In a moving-picture machine, two relatively movable shutters and mechanism for operating said shutters at different speeds, for the purpose set forth.

4. In a moving-picture machine, a plurality of relatively movable light-intercepting means and means for operating the same at different speeds, for the purpose specified.

5. In a moving-picture machine, two relatively movable shutters, each the sector of a circle and one larger than the other, and mechanism for actuating the same, said mechanism operating to move one of the same much more rapidly than the other.

Witness my hand this 3d day of March, 1903, at the city of New York, in the county and State of New York.

ALBERT E. SMITH.

Witnesses:
HERMAN MEYER,
ERNEST H. BOISE.